March 17, 1964 S. E. BOONE 3,125,401
VIBRA-PEN SCRIBER ASSEMBLY
Filed April 7, 1961 2 Sheets-Sheet 1

INVENTOR.
STEPHEN E. BOONE
BY
Lawrence S. Epstein
ATTORNEY

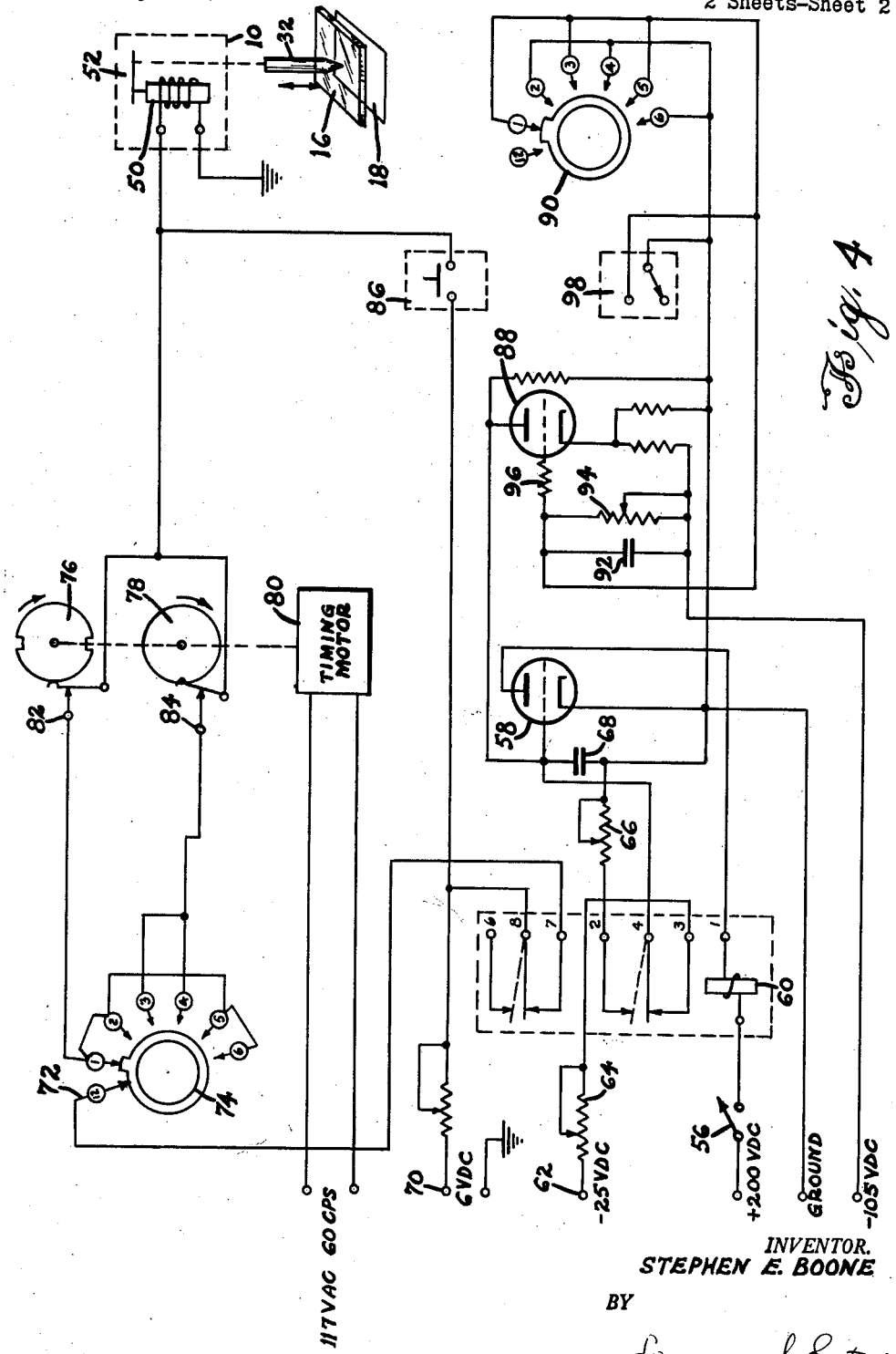

United States Patent Office 3,125,401
Patented Mar. 17, 1964

3,125,401
VIBRA-PEN SCRIBER ASSEMBLY
Stephen E. Boone, Mission Hills, Calif., assignor, by mesne assignments, to the United States of America as represented by the Secretary of the Navy
Filed Apr. 7, 1961, Ser. No. 101,604
4 Claims. (Cl. 346—140)

This invention relates to writing instruments, and has particular reference to a writing instrument which finds particular utility when used with recording instruments of the type which write upon a chart as a result of relative motion between the chart and the stylus.

In recording instruments which record the motion of a vehicle across a portion of the earth's surface by changing the position of the recording surface and the writing instrument relative to each other difficulty has been encountered in several aspects of the presentation. First of all to indicate time elapsed along the flight path a separate marking sequence is usually needed. Secondly, the prior art devices usually were opaque thus causing difficulty in reading of the presented information. Further, previous writing devices have produced markings which fail to be as distinct as would be desirable.

The present device contains several features which overcome many of the difficulties of the prior art devices. First, large portions of the device are made of a transparent plastic to permit better viewing of the markings. Secondly, a unique pen assembly which is movable perpendicularly with respect to the writing surface is used in conjunction with electrical writing and interrupting equipment to provide an easily read line made of distinct dots which is interrupted periodically to indicate the elapsed time.

It is therefore an object of this invention to provide a writing instrument which may be used with recording devices of various kinds and which overcomes the above mentioned disadvantages.

It is also an object of this invention to provide a writing instrument which produces a more easily observable marking than prior art devices.

Another object of this invention is to provide a pen for recording the path of vehicles that indicates elapsed time.

Figure 1:
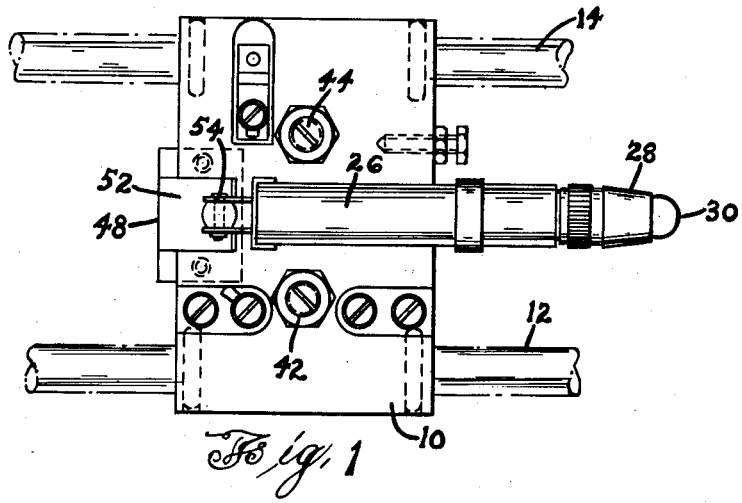
Figure 2:
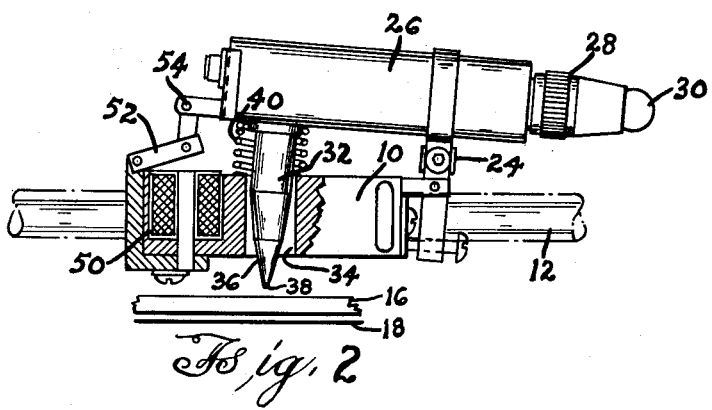
Figure 3:
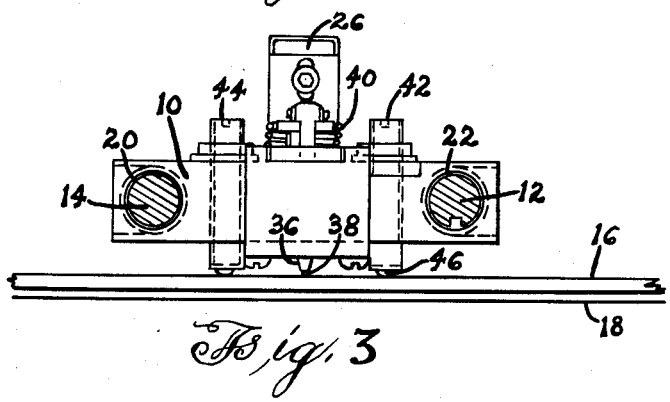

Other objects and many of the attendant advantages of this invention will be readily appreciated as the same becomes better understood by reference to the following detailed description when considered in connection with the accompanying drawings wherein:

FIG. 1 is a top view of the pen assembly;
FIG. 2 is a side elevation of the pen assembly;
FIG. 3 is a front elevation of the pen assembly; and
FIG. 4 is a schematic diagram of the circuitry involved.

Referring to FIGS. 1–3, the carriage 10 rides on two supporting rods 12 and 14 above a Plexiglas writing surface 16 through which map 18 may be observed. The carriage 10, made of Plexiglas to facilitate viewing of the map surface and markings, contains apertures 20 and 22 through which the supporting rods 12 and 14 are inserted. The supporting rods are the only portion of the system for transporting the pen assembly over the writing surface that is shown in the drawing. The transporting system forms no part of the invention and therefore is not described.

Pivotally supported at 24 above the carriage 10 is an ink reservoir 26. The ink reservoir 26 is made of an epoxy resin which will resist all corrosive action of the ink and cleaning solvents and at the same time permit the ink level to be observed through the wall of the reservoir. The reservoir is provided with a threaded cap 28 which may be opened for filling. A spring loaded ball (not shown) employed inside the threaded cap to seal the reservoir is tied with a small chain (not shown) to a large ball 30 on the top of the cap. Occasionally, a vacuum is created in the normally air tight reservoir which prevents the ink from flowing. If the large ball 30 is flipped by the thumb the seal inside the cap is opened and a sufficient amount of air is permitted to enter the reservoir to cause the ink to flow again.

A pen point assembly 32 depends from the reservoir 26 through a hole 34 in the Plexiglas carriage 10. The pen point assembly consists of a machined aluminum tube which is threaded at one end to screw into the reservoir. The other end of the tube, 36, is conically formed with a machined ball 38 press fitted in a hole at the apex of the cone. This ball point 38 is spring loaded and releases the ink only when it is depressed on the writing surface. The pen assembly and the reservoir are supported in the opening 34 by a spring 40 axially mounted around the pen assembly 32 between the reservoir 26 and the carriage 10.

Two lead ball screws 42 and 44 are mounted on each side of the pen in the Plexiglas carrier 10. The lead ball screws each contain a spring loaded ball 46 which when the screw is properly adjusted rolls on the plotting surface. With the balls rolling on the surface the pen point 38 in its unenergized position will travel a 16th of an inch off the surface of the Plexiglas.

A solenoid 48 connected to the carriage 10 is used to bring the point of the pen 38 in contact with the Plexiglas writing surface 16. Activating of the solenoid coil 50 attracts the solenoid armature 52 which through a linkage 54 causes the ink reservoir 26 to compress the spring 40, bringing the point of the pen to touch the Plexiglas writing surface.

Referring to FIGURE 4 closing of a switch 56 causes current to flow from the tube 58 through the relay 60. Activating of the relay couples contact 7 to 8 and 3 to 4. Coupling of contacts 3 and 4 connects the negative voltage 62 to the grid of tube 58. This negative voltage cuts off the tube and thus de-energizes the relay. The de-energization of the relay decouples terminals 7 and 8 and 3 and 4 while coupling terminals 2 and 4 to provide a discharge path for capacitor 68. The negative voltage is thus lifted from the grid of tube allowing this tube to conduct thus beginning another cycle. The frequency with which this cycle repeats itself is determined by how fast the negative voltage is discharged thru an RC circuit made of a variable resistor 66 and a capacitor 68 interposed between the grid of the tube 58 and ground. The variable resistor may be adjusted to vary the frequency of the cycling between the limits of 5 to 10 cycles a second.

The opening and closing of contacts 7 and 8 alternately connects and disconnects a 6 volt power supply 70 to a terminal 72 of a multi-terminal switch 74 thereby providing a time base on the writing surface which is independent of the particular channel then being recorded. The switch 74 connects this input to one of several channels. Each channel is connected with a cam operated switch. The cams 76 and 78 are driven by a constant speed timing motor 80 and have indentations in them which open the circuits when the contacts 82 and 84 pass over them. The opening and closing of the contacts 82 and 84 periodically interrupts the flow of the current from the 6 volt supply 70 to the coil of the solenoid 50 to identify which channel is being recorded. When it becomes desirable to bypass the vibrating and interrupting circuits depressing of a microswitch 86 connects the 6 volt supply directly to the coil of the solenoid 50.

The second tube 88 and the other wafer 90 of the multi-terminal switch compose a squelch circuit to halt the cycling of the vibrator circuitry during the switching interval of the multiterminal switch 74. The second tube 88 is normally inoperative. However, when the multiterminal switch 74 is turned, during the interval of the change, the second multiterminal switch 90 shorts the grid of the second tube 88 to ground. This causes the second tube to conduct. When the tube conducts the voltage at its plate becomes negative. The plate is connected to the grid of the first tube and when it becomes negative it cuts off the grid of the first tube. The time for which the plate of the tube 88 remains negative is determined by the time constant of a circuit composed of a capacitor 92, a variable resistor 94, and a fixed resistor 96. The squelch circuit may also be operated by the closing of multiterminal switch 98.

In operation when the starting switch 56 is closed the vibrating circuit composed of the relay 60 and the tube 58 couples and uncouples the six volt D.C. supply 70 to the coil of the solenoid 50 at the rate of 5 to 10 cycles per second. In this manner the solenoid is alternately energized and de-energized so that during the period of energization its armature 52 through a linkage 54 overcomes the force of the spring 40 and presses the penpoint 32 against the writing surface 16 and during the periods of de-energization the spring 40 returns the pen 36 to its rest position. When the pen 36 is depressed its point 38 is forced back into the barrel permitting ink to flow around it and thus causing a mark to appear on the writing surface. Because the lead ball screws 86 keep the distance between the writing surface 16 and the pen point 38 in its rest position constant and because the solenoid voltage is unvarying the force with which the point hits the writing surface does not change. This has the effect of keeping the markings uniform.

To permit measurements of time and velocities the vibrating signal is passed through a cam operated switch 76. The cam which is driven by a 1 r.p.m. motor opens the contacts 82 and 84 periodically. This opens up the circuit between the oscillating voltage source and the solenoid 50 and thus deactivates the solenoid. This periodic de-activation of the solenoid withdraws the pen from the writing surface and thus leaves blank spaces in the inscribed line. Since these blank spaces occur at timed intervals they may be counted to determine elapsed time between events and the distance between them may be measured to determine the speed of the tracked vehicle.

If several vehicles are to be tracked turning of the multiterminal switch 74 will switch one of the cams 76 out of the circuit and introduce the other 78. As shown two cams are used, however, as many cams as desired may be added. As two channels are only shown in the drawing, terminals 1 and 2 are shown shorted to terminals 5 and 6. If three channels are to be used an additional cam would have to be provided in addition to opening the connection between terminals 1 and 2 and terminals 3 and 4. Each of the cams has a unique timing period associated with it to identify the respective information channel associated therewith. The differences in the lines caused by the different time periods will enable the observer to distinguish one vehicle channel from another.

While the channels are being changed the second wafer on the two wafer switch shorts the grid of the squelch circuit to ground. This is because when the information channels are changed from one to another, the contact of 90, being ganged to 74, moves from an odd numbered terminal to another adjacent odd numbered terminal through an even numbered terminal. As all the even numbered terminals are grounded, the grid of tube 88 will be shorted to ground during a channel change. This puts a large negative voltage on the grid of the vibrator tube 58 and thus uncouples terminals 7 and 8. The uncoupling of terminals 7 and 8 prevents the marking of the inscribing surface during the change interval.

Obviously many modifications and variations of the present invention are possible in the light of the above teachings. It is therefore to be understood that within the scope of the appended claims the invention may be practiced otherwise than as specifically described.

What I claim is:

1. A pen for inscribing lines on surfaces to indicate the flight path and speed of vessels comprising,
a carriage having,
a transversely extending aperture through approximately the center thereof,
electromagnetic means recessively connected to the body of said carriage and disposed in flush arrangement therewith,
supporting means connected to said carriage, said carriage being slidable therewith,
marking means longitudinally disposed angularly within said aperture in a non-writing position,
reservoir marking means at one end pivotedly mounted on the top portion of said carriage body adjacent one edge thereof and having the non-marking end of said marking means terminating in the lower portion of said reservoir means thereby providing gravity feeding for said marking means,
armature means juxtaposed to said electromagnetic means and rotatably disposed at one end thereof adjacent the other oppositely positioned carriage edge,
link means pivotedly coupling the other end of said armature means and the other end of said reservoir marking means,
spring bias means encircling said marking means whereby energization of said electromagnetic means will rotate the armature means and coupled reservoir means against the spring bias means to thereby vertically position the pen means preparatory to the marking operation.

2. The device of claim 1, including interrupting means coupled to said electromagnetic means for operating said pen means.

3. A pen for inscribing lines on surfaces to indicate the flight path and speed of vessels comprising,
a carriage having,
a first circular aperture extending through the center of said carriage in a transverse direction,
a solenoid, and having its longitudinal axis parallel to the longitudinal axis of said first aperture, and its top portion being disposed in flush position with the top side of the carriage,
a plurality of rods supporting said carriage and so arranged to permit lateral motion of said carriage,
marking pen means longitudinally disposed angularly within said first aperture in a non-writing position,
longitudinal marking fluid reservoir means at one end pivotedly mounted at one edge of the top side of said carriage body and having the top end of said marking pen terminating in the lower side portion of said ink reservoir thereby providing gravity feeding for such marking means,
armature means rotatably disposed at one end on the other oppositely positioned top edge of the carriage adjacent said solenoid,
link means pivotedly coupling the other end of said armature and the other end of said ink reservoir means,
spring bias means disposed around said pen means whereby energization of said solenoid will rotate the armature and coupled reservoir means against the spring bias to thereby position the longitudinal axis of the pen means transverse to the writing surface.

4. A pen for inscribing lines on surfaces to indicate the flight path and speed of vessels comprising,
a carriage having,
a first circular aperture extending through the center of said carriage in a transverse direction,
a second and third circular aperture each extending through said carriage in a direction transverse to the longitudinal axis of said first aperture and located near the edges of said carriage and having their respective longitudinal axis parallel to one another, a solenoid disposed within said carriage, and having its longitudinal axis parallel to the longitudinal axis of said first aperture and its top portion in alignment with the top side of said carriage, two rods slidably extending through said second and third apertures for supporting said carriage, marking pen means longitudinally disposed angularly within said first aperture in a non-writing position, said pen generally conically shaped and having at its lower end a mechanical ball press-fitted at its apex, ink reservoir means pivotedly mounted at one edge thereof on one edge of the top side of said carriage body, and having the top end of said marking pen terminating in the bottom portion of said ink reservoir thereby providing gravity feeding for said marking pen, armature bar means pivotedly mounted at one end on the other oppositely disposed top edge of the carriage adjacent said solenoid means, a two-bar coupling link means pivotedly coupling the other end of said armature and the other end of said ink reservoir means, spring bias means disposed substantially concentrically to the longitudinal axis of said pen means and located at one end along the top edge of said first circular aperture and disposed at the other end against the lower portion of said ink reservoir whereby upon energization of said solenoid said armature and said pivotedly coupled reservoir means are rotated inwardly against said spring bias means to dispose the longitudinal axis of pen means in alignment with the longitudinal axis of said first aperture thereby depressing the ball end of said pen against the writing surface.

References Cited in the file of this patent

UNITED STATES PATENTS

| 881,479 | Merriam | Mar. 10, 1908 |
| 1,091,804 | Burch et al. | Mar. 31, 1914 |
| 2,132,225 | Subrizi | Oct. 4, 1938 |
| 2,761,753 | Iatesta | Sept. 4, 1956 |

FOREIGN PATENTS

| 27,920 | Netherlands | Sept. 15, 1932 |
| 554,030 | Great Britain | June 16, 1943 |
| 1,041,450 | France | May 27, 1953 |